Sept. 2, 1969  P. HUTCHINSON  3,464,232
UNIVERSAL JOINTS

Filed March 11, 1966  2 Sheets-Sheet 1

INVENTOR
PHILIP HUTCHINSON
BY Young & Thompson
ATTORNEYS

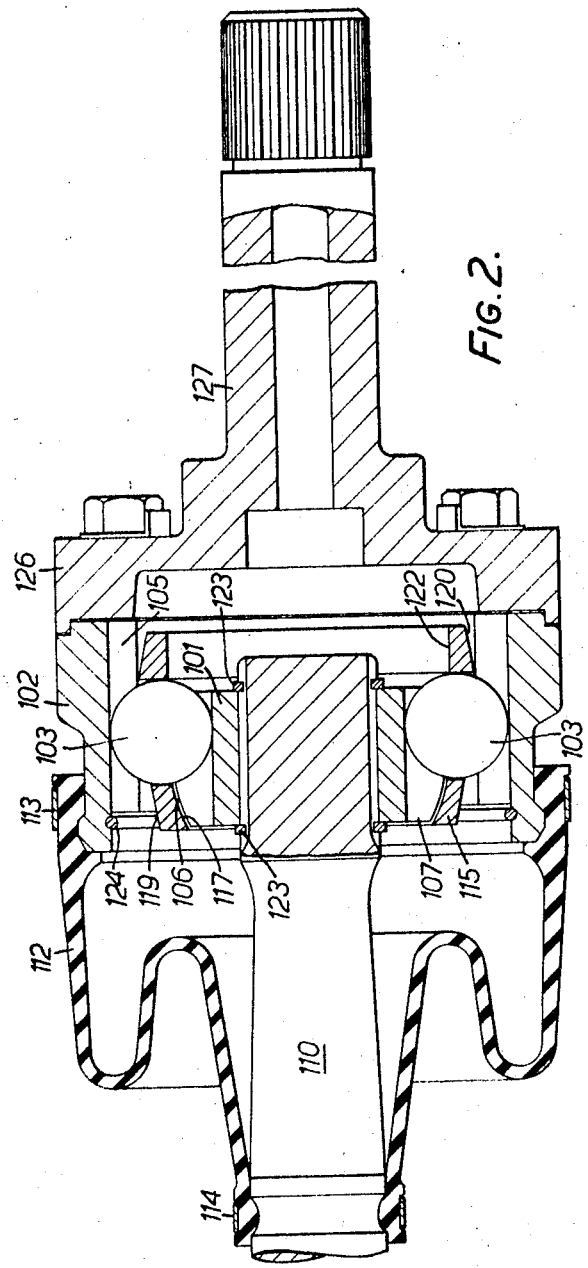

United States Patent Office 3,464,232
Patented Sept. 2, 1969

3,464,232
UNIVERSAL JOINTS
Philip Hutchinson, Birmingham, England, assignor to Birfield Engineering Limited, London, England
Filed Mar. 11, 1966, Ser. No. 533,634
Claims priority, application Great Britain, Mar. 24, 1965, 12,397/65
Int. Cl. F16d 3/33
U.S. Cl. 64—21     5 Claims This invention relates to universal joints of the constant velocity type which are capable of accommodating "plunge," i.e., relative axial movement of inner and outer drive members of the joint. Joints of this type have inner and outer members formed with grooves, the grooves in the two members cooperating to form ball tracks which are angularly distributed around the joint axis and engaged by torque-transmitting balls which move along the grooves during joint articulation and plunge.

The constant velocity characteristics of such a joint depend on accurate location of the balls so that for all joint angles the ball centres lie in the median plane of the joint, i.e., a plane which passes through the instantaneous centre of the joint and bisects the instantaneous input and output axes of the joint. Such axes are the rotational axes of the two joint members and the joint centre is the point at which these axes intersect; the term "joint axis" as used herein refers to the common input and output axis in the condition of zero joint angle.

Ball location is conveniently achieved by means of a cage in which the balls are housed, the cage position being suitably controlled. The main advantage of such a construction is that track grooves of simple form can be used as they need play no part in ball guiding, and it is an object of the invention to provide a constant velocity plunge joint in which the cage position is controlled in a simple and accurate manner.

According to the invention a constant velocity joint has a hollow outer member with a cylindrical bore formed with longitudinally extending grooves, an inner member having a part-spherical outer surface formed with grooves which cooperate with the grooves in the outer member to provide ball tracks, torque-transmitting balls which engage and move along the grooves during joint articulation and plunge, and a ball cage with apertures in which the balls are housed, the cage acting to centre the inner member within the outer member and having part-spherical inner and outer surfaces which respectively engage the part-spherical surface of the inner member and the cylindrical bore of the outer member and which have centres of curvature offset by an equal amount on opposite sides of the plane of the ball centres along the joint axis.

As the form of the ball tracks plays no part in ball guiding, the offset part-spherical surfaces of the cage alone acting to control the position of the latter so that the balls are maintained in the median plane, straight ball tracks parallel to the axes of the joint members may be used. The outer member is conveniently formed by a broaching operation, and to this end the outer member is conveniently of generally cylindrical open-ended form.

The inner member may be splined or otherwise attached to the end of a drive shaft, but as the form of cage utilised with the invention can be designed to provide ample assembly clearance the inner member can be formed integrally with the shaft which is then of ball-ended form. To provide a cage of maximum strength and side edges of reasonable thickness, only the effective outer surface portion thereof which engages the outer member bore need be of said part-spherical form, the rest of the outer surface conveniently being frustoconical.

A frustoconical form of the end portions of the cage not only strengthens the latter but has the advantage that one of these portions can engage the bore of the outer member at the limit of joint articulation. Such engagement provides a positive stop to prevent "overangling" of the joint.

One end of the cage may be counterbored to provide adequate clearance for assembly on the inner member. The counterbore preferably exposes the ends of the cage ball apertures; during assembly the lands on the inner member between the ball grooves being inserted through the counterbore in register with the apertures. This avoids the necessity of employing excessively wide apertures merely to provide clearance on assembly as the inner member can be inserted axially, instead of being angled in with one land passing through a specially widened cage aperture which would otherwise be necessary.

The number of ball tracks and balls is governed by design considerations, the size of the balls being a factor in the torque capacity of the joint. One of such design considerations is the effect of high speed operation due to the fact that as the joint rotates in a condition of articulation the cage is submitted to an alternating load by each ball in turn to maintain the cage in the median position. Thus increasing the number of balls smoothes out the load peaks applied to the cage, and in most cases six balls is found a reasonable compromise between a simple joint construction and smooth cage operation.

One end of the outer member is conveniently closed by a suitable end cap or blanking plate and the opposite end, from which the drive shaft associated with the inner member projects, is conveniently sealed by a flexible rubber boot. Internal spring rings are conveniently let into the cylindrical bore of the outer member to retain the cage, ball and inner member assembly captive within the outer member and prevent accidental disassembly.

The invention will now be further described with reference to the accompanying drawings which illustrate, by way of example, two forms of constant velocity universal joint capable of accommodating both articulation and plunge. In the drawings:

FIGURE 2 is a generally similar view of the other joint, and

Figure 1:
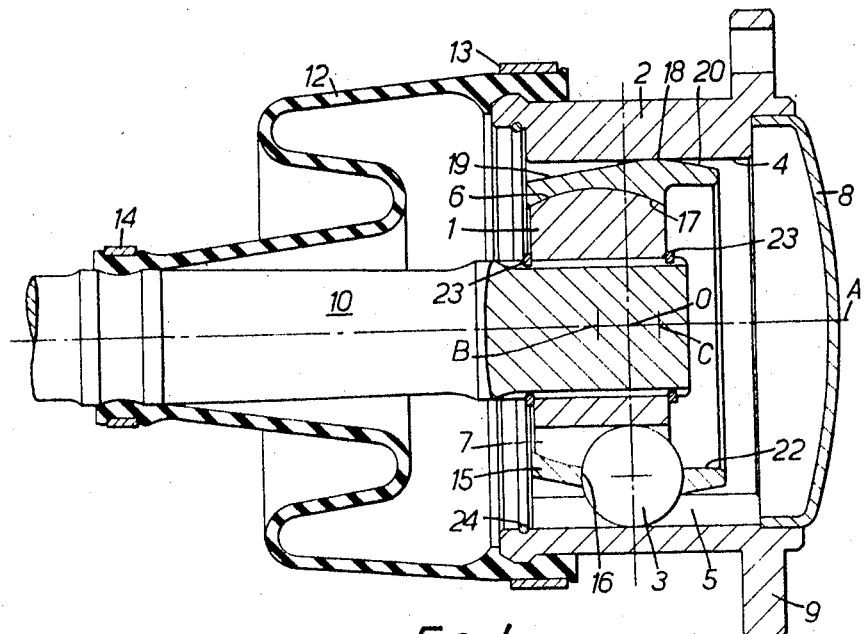
FIGURE 1 is an axial section view of one of the joints.

Referring first to FIGURE 1, the joint illustrated therein comprises an inner member 1 axially movable within a hollow generally cylindrical outer member 2 and coupled therein to a series of six equiangularly spaced torque-transmitting balls such as 3. The sectioning of the joint is taken in different radial planes above and below the joint axis A respectively, whereby to show above that axis the sectional form of the joint components between adjacent balls 3.

The outer member 2 has a cylindrical through bore 4 with longitudinally extending grooves 5 parallel to the central axis of the outer member 2 which coincides with the joint axis A. The inner member 1 has a part-spherical outer surface 6 similarly machined with straight grooves such as 7 parallel to the rotational axis of that member, which again coincides with the axis A in the zero angle condition shown. The grooves 5 and 7 in the two members cooperate in pairs to provide ball tracks along which the balls 3 roll during joint articulation and plunge.

The open-ended form of the outer member 2 enables the latter to be produced by a broaching operation. At one end the member 2 is closed by a blanking plate 8 and adjacent that end it has an external peripheral flange 9 and bolting to a drive shaft (not shown). The inner member 1 has a splined connection with a drive shaft 10 which projects from the opposite end of the outer member 2. The latter end is closed by a flexible rubber boot 12 clamped at one end to the outer member 2 by a retaining ring 13 and at the other end to the projecting drive shaft 10 by a retaining ring 14.

A ball cage 15 with apertures such as 16 in which the balls 3 are closely received is positioned between the members 1 and 2 and acts to centre the inner member 1 within the outer member 2. The cage 15 has an inner part-spherical surface 17 which mates with the complementary surface of the inner member 1 so that the cage 15 not only centres the inner member but is held captive thereon in the axial sense. The cage 15 also has a part-spherical intermediate surface portion 18 adjacent one end, and this surface engages the cylindrical bore 4 of the outer member 2.

Figure 3:
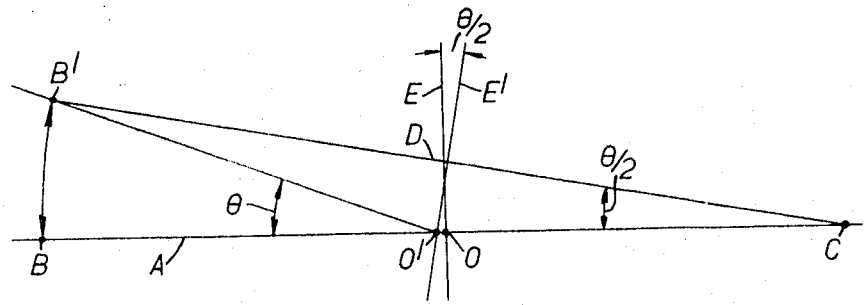
FIGURE 3 is a diagram illustrating the joint geometry in each case.

Referring now to the diagram of FIGURE 3, which illustrates the geometry at zero angle and a joint angle θ, the inner cage surface 17 is centred about a point B on the joint axis A which is displaced from the joint centre O, i.e. the point at which the plane containing the ball centres intersects the joint axis, towards the side of the joint from which the drive shaft 10 projects. The outer surface portion 18 of the cage 15 is centred on a point C which is also disposed on the joint axis A but is offset from the joint centre O by an equal amount in the opposite direction, considering conditions at zero joint angle.

As a result of the offset of the inner and outer cage surfaces, during joint articulation through the angle θ the inner member 1 in effect pivots around the offset centre B of the inner cage surface and the outer member 2 pivots round the offset centre C of the outer cage surface. As the cage 15 is constrained within the outer member 2 the centre C of the outer cage surface must always lie on the joint axis A, and the equal offset of the centres B and C ensures that the plane E of the ball centres articulates accurately through half the joint angle, i.e., an angle of θ/2, thus maintaining constant velocity characteristics. The centre of the inner cage surface 17 moves off the joint axis A to the point B', and the point at which the axis A intersects the new ball centre plane E' is displaced slightly from the theoretical joint centre O, i.e. the centre at zero joint angle, to the position O'. This displacement is, however, very small and is accommodated by axial movement of the cage 15 within the outer member 2. Thus there is no tendency to jam and the geometry is such that the cage surface centres B and C always remain equally offset from the instantaneous joint centre O'. Hence the plane of the ball centres must always be the true median plane of the joint. In FIGURE 3 the cage axis in the angled condition is indicated by D.

With joints of the plunging type a maximum working angle of about 20° is normally ample, and as the cage 15 moves through only half the joint angle the part-spherical outer surface portion 18 need only subtend an angle of 10° at the joint centre O. The adjoining end outer surface portions 19 and 20 of the cage 15 are of frustoconical form tangential to the part-spherical surface 18. This allows the cage 15 to be of much stronger construction and thicker at the ends than if the outer surface were completely part-spherical, and the frustoconical surface 19 is arranged so that it engages the bore 4 to provide a positive stop against overangling of the joint.

The end of the cage 15 at which the outer surface portion 20 is formed is counterbored at 22 to a diameter which allows the inner member 1 to pass through on assembly. As can be seen from FIGURE 1 the counterbore exposes the ends of the ball apertures 16 in the cage, and during assembly the inner member 1 is passed through the counterbore with the lands on that member between the grooves 7 in register with the apertures 16. When the member 1 is inserted fully into the cage it is turned therein to the final position, in which it is captive within the cage and the balls 3 can be fitted.

The counterbore 22 allows easy assembly even if the inner member 1 is already fitted on the shaft 10. The member 1 is splined on to the shaft 10 and retained thereon by spring circlips 23 let into the shaft. If necessary the cage 15 can be reversed on the inner member 1 in order to utilise the counterbore 22 to provide clearance for the shaft 10 at the limit of articulation. The counterbore 22 also reduces the cage mass while yet leaving an adequate metal thickness for strength at the end.

An internal spring ring 24, let into a counterbore at the open end of the outer member 25, acts to retain the cage, ball and inner member assembly captive within the outer member.

The ball tracks 5 and 7 are of generally elliptical cross-section to provide a pressure angle for the balls of approximately 30°. This angle is the angle between a line passing through a ball centre and the joint centre, and a radius of that ball passing through the point of contact with a track flank.

The embodiment of the invention shown in FIGURE 2 is basically similar to that of FIGURE 1, and corresponding parts are represented by the same reference numerals increased by 100. Thus, for example, the cage 115 in FIGURE 2 corresponds to the cage 15 in FIGURE 1. The main difference is that the end of the outer member 102 is closed by an attachment flange 126 at one end of a stub shaft 127 by means of which the outer member is in use connected in the drive sense. Thus the outer member 102 itself is of somewhat simpler form, in particular the flange 9 being omitted.

As can be seen from the drawings, the inner member 101 and cages 115 are generally similar to those of FIGURE 1, FIGURE 2 being a complete section in one diametral plane.

I claim:
1. A constant velocity joint comprising a hollow outer member with a cylindrical bore formed with grooves extending lengthwise of the bore, an inner member having a part-spherical outer surface formed with grooves which cooperate with the grooves in the outer member to provide ball tracks, the inner member being free for both articulatory and axial movement within the outer member, balls which engage and move along the grooves during relative movement of said members and which transmit torque between the members, and a ball cage which acts to centre the inner member within the outer member and has apertures in which the balls are received, the cage having part-spherical inner and outer surfaces which respectively engage said outer surface of the inner member and said bore of the outer member and which have centres of curvature offset by an equal amount on opposite sides of the joint centre along the joint axis, and the cage also being formed with a counterbore at one end to facilitate assembly of the cage on the inner member.

2. A constant velocity joint according to claim 1, wherein said counterbore provides clearance for the overall diameter of the inner member and exposes the ends of said cage apertures.

3. A constant velocity joint according to claim 1, wherein at least one end portion of the cage has an external generally frustoconical shape which merges smoothly with said part-spherical outer surface of the cage and which engages said bore of the outer member to provide a positive stop limiting joint articulation.

4. An constant velocity joint according to claim 3, wherein said frustoconical end portion of the cage is at the end formed with said counterbore.

5. A constant velocity joint according to claim 3, wherein both end portions of the cage are of generally frustoconical external shape merging smoothly with said part-spherical outer surface of the cage.

References Cited

UNITED STATES PATENTS

| | | | |
|---|---|---|---|
| 1,975,758 | 10/1934 | Stuber | 64—21 |
| 2,046,584 | 7/1936 | Rzeppa | 64—21 |
| 2,911,805 | 11/1959 | Wildhaber | 64—21 |
| 3,162,026 | 12/1964 | Ritsema | 64—21 |
| 3,237,429 | 3/1966 | Henry-Biabaud | 64—21 |

HALL C. COE, Primary Examiner